(12) United States Patent
Morin

(10) Patent No.: US 8,181,350 B1
(45) Date of Patent: May 22, 2012

(54) PRECISION CUTTING SYSTEM

(75) Inventor: Francois C. Morin, North Port, FL (US)

(73) Assignee: Francois C Morin, North Port, FL (US)

( * ) Notice: Subject to any disclaimer, the term of this patent is extended or adjusted under 35 U.S.C. 154(b) by 1182 days.

(21) Appl. No.: 11/747,589

(22) Filed: May 11, 2007

(51) Int. Cl.
*B21F 13/00* (2006.01)
*B23D 45/12* (2006.01)
*B23D 45/16* (2006.01)
*B26B 25/00* (2006.01)
*B27B 9/02* (2006.01)

(52) U.S. Cl. ............ 30/90.4; 30/90.3; 30/92.5; 30/101; 30/377; 30/390

(58) Field of Classification Search ............ 30/90.4, 30/92.5, 390, 391, 90.1–90.3, 92, 371–377, 30/93–101; 83/924; 451/451; 81/9.4, 9.51; 125/13.01
See application file for complete search history.

(56) References Cited

U.S. PATENT DOCUMENTS

| | | | | |
|---|---|---|---|---|
| RE17,087 E * | 9/1928 | Billingsley | | 30/376 |
| 1,803,068 A * | 4/1931 | McKeage | | 30/390 |
| 1,975,191 A * | 10/1934 | Calef | | 452/149 |
| 2,329,805 A * | 9/1943 | Wilson, Sr. | | 30/90.4 |
| 2,654,941 A * | 10/1953 | Schleimer | | 30/90.3 |
| 2,819,742 A * | 1/1958 | Blachly | | 30/373 |
| 2,973,576 A * | 3/1961 | Hentke | | 30/92 |
| 3,535,785 A * | 10/1970 | Matthews | | 30/91.2 |
| 3,633,275 A * | 1/1972 | Hutchinson | | 30/90.3 |
| 3,722,496 A * | 3/1973 | Schuman | | 125/13.01 |
| 4,022,182 A * | 5/1977 | Lenkevich | | 125/13.01 |
| 4,142,290 A * | 3/1979 | Ducret | | 30/90.9 |
| 4,267,636 A * | 5/1981 | Ducret | | 30/90.3 |
| 4,353,165 A * | 10/1982 | Albery | | 30/376 |
| 4,977,671 A * | 12/1990 | Ducret | | 30/90.2 |
| 5,305,529 A * | 4/1994 | Tarpill | | 30/374 |
| 5,570,511 A * | 11/1996 | Reich et al. | | 30/376 |
| 5,588,213 A * | 12/1996 | Swanberg | | 30/124 |
| 6,108,916 A * | 8/2000 | Zeiler et al. | | 30/391 |
| 6,735,875 B1 * | 5/2004 | Eslambolchi et al. | | 30/377 |
| 7,191,526 B2 * | 3/2007 | Zeiler et al. | | 30/391 |
| 7,300,339 B2 * | 11/2007 | Gaul et al. | | 451/451 |
| 7,661,194 B1 * | 2/2010 | Ende | | 30/376 |
| 7,958,641 B1 * | 6/2011 | Ende | | 30/376 |
| 2007/0074404 A1 * | 4/2007 | Zhang | | 30/376 |
| 2008/0244910 A1 * | 10/2008 | Patel | | 30/123 |
| 2009/0313831 A1 * | 12/2009 | Patel | | 30/123 |

* cited by examiner

Primary Examiner — Clark F. Dexter

(57) ABSTRACT

A precision cutting system for efficiently cutting through an external member (i.e. conduit, etc.) without damaging internal components (i.e. wires, cables, etc.). The precision cutting system generally includes a first support structure including a first inner end and a first outer end, a second support structure including a second inner end, a second outer end and an opening extending between thereof, wherein the second support structure attaches to the first support structure and a guide structure extending from the second support structure opposite the first support structure. The first support structure attaches to a cutting tool, wherein the blade of the cutting tool extends between the first inner end and the first outer end of the first support structure, through the opening of the second support structure and adjacent the guide structure.

10 Claims, 8 Drawing Sheets

PRECISION CUTTING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to cutting tools and more specifically it relates to a precision cutting system for efficiently cutting through an external member (i.e. conduit, etc.) without damaging internal components (i.e. wires, cables, etc.).

2. Description of the Related Art

Any discussion of the prior art throughout the specification should in no way be considered as an admission that such prior art is widely known or forms part of common general knowledge in the field.

Cutting tools have been in use for years. Typically, cutting tools exist in a variety of forms and are utilized to cut various materials. Cutting tools can also range greatly in the amount of accuracy efficiently achieved with the cutting tool, wherein a cutting tool such as a hacksaw may provide a large amount of accuracy and a cutting tool such as a chainsaw may provide less accuracy.

It may sometimes be necessary to cut within a conduit to access various cables or to cut within a cable to access a wire(s) within the cable. However, many commonly utilized cutting tools do not allow an individual to easily cut through materials, such as but not limited to cylindrical tubing (i.e. conduit), at a precise and consistent thickness or else take a long time to cut through materials. Cutting around electrical wires can be very dangerous in that if the cutting tool is extended too far within the conduit or cable the wire may be severed causing a severe electrical shock or spark.

Because of the potential of severe injury due from electrical shock, it is often strongly recommended to turn off any power running through cables or wires near where an individual is cutting. Constantly turning off and on electrical wires can be a hassle, especially when the electrical wires are powering a device that the individual does not want to turn off. Because of the general lack of efficiency and practicality in the prior art there is the need for a new and improved precision cutting system for efficiently cutting through an external member (i.e. conduit, etc.) without damaging internal components (i.e. wires, cables, etc.).

BRIEF SUMMARY OF THE INVENTION

The general purpose of the present invention is to provide a precision cutting system that has many of the advantages of the cutting tools mentioned heretofore. The invention generally relates to a cutting tool which includes a first support structure including a first inner end and a first outer end, a second support structure including a second inner end, a second outer end and an opening extending between the second inner and outer ends, wherein the second support structure attaches to the first support structure and a guide structure extends from the second support structure opposite the first support structure. The first support structure attaches to a cutting tool, wherein the blade of the cutting tool extends between the first inner end and the first outer end of the first support structure, through the opening of the second support structure and adjacent the guide structure.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a precision cutting system for efficiently cutting through an external member (i.e. conduit, etc.) without damaging internal components (i.e. wires, cables, etc.).

Another object is to provide a precision cutting system that efficiently cuts material (i.e. cable, conduit, etc.) at a consistent and precise depth.

An additional object is to provide a precision cutting system that is adaptable to various commonly utilized power tools.

A further object is to provide a precision cutting system that efficiently strips cable from wires.

Another object is to provide a precision cutting system that efficiently cuts through conduit of various thicknesses.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
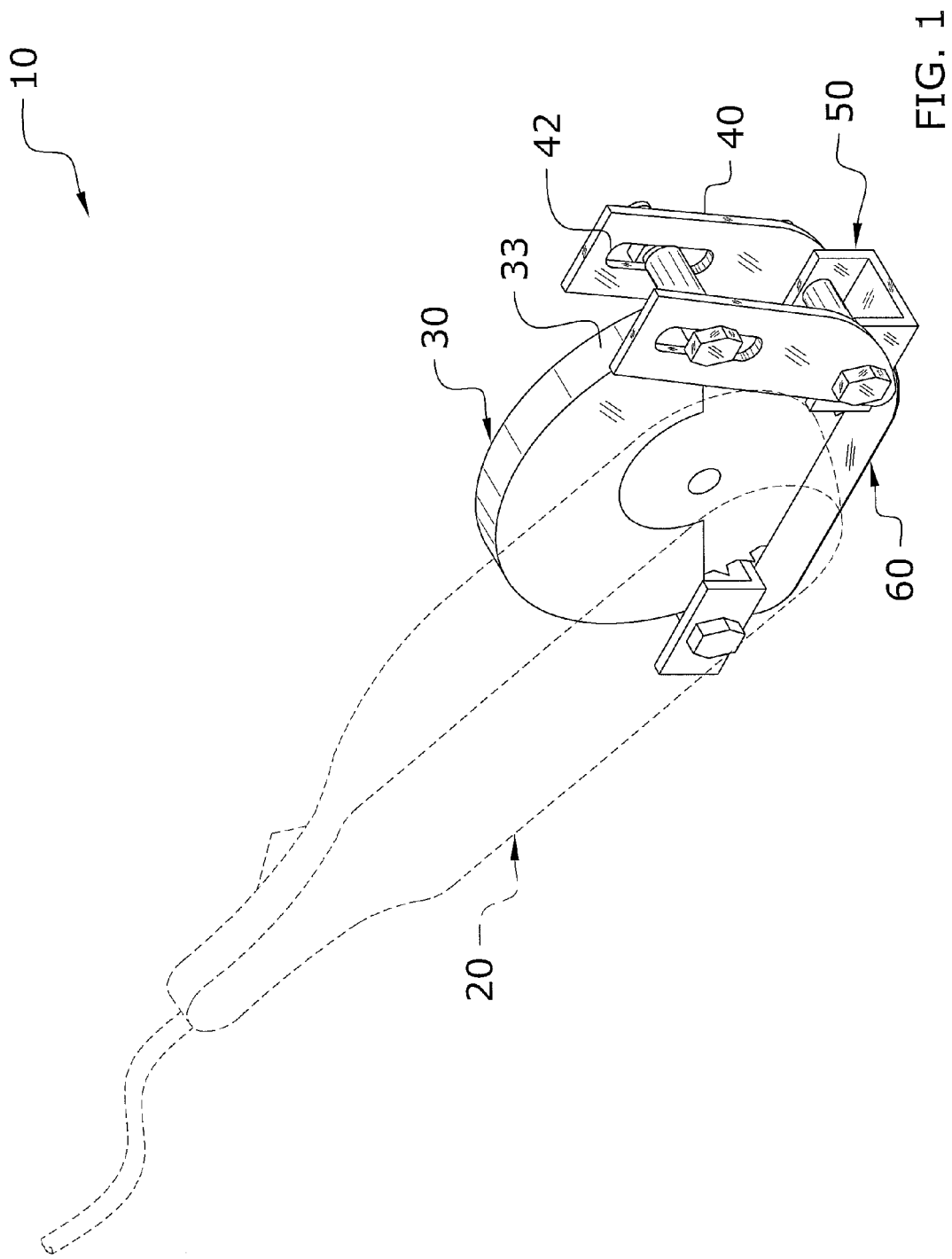
FIG. 1 is an upper perspective view of the present invention attached to a cutting tool.

Turning now descriptively to the drawings, in which similar reference characters denote similar elements throughout the several views, FIGS. 1 through 8 illustrate a precision cutting system 10, which comprises a first support structure 30 including a first inner end 32 and a first outer end 33, a second support structure 50 including a second inner end 52, a second outer end 53 and an opening 54 extending therebetween, wherein the second support structure 50 attaches to the first support structure 30 and a guide structure 60 (FIGS. 1-6), 70 (FIGS. 7-8) extending from the second support structure 50 opposite the first support structure 30. The first support structure 30, which functions as a guard, attaches to a cutting tool 20 in the conventional manner for such a guard structure, wherein the blade 22 of the cutting tool 20 extends between the first inner end 32 and the first outer end 33 of the first support structure 30, through the opening 54 of the second support structure 50 and adjacent the guide structure 60, 70.

It is appreciated that in the description and drawings of the present invention cable 14 and conduit 12 are described as being the materials that are cut with the present invention. It is appreciated however that the present invention may be utilized to cut various materials rather than conduit 12 or cable 14.

B. Cutting Tool

The cutting tool 20 is comprised of a power tool configuration, wherein the cutting tool 20 may operate on a DC power source (i.e. batteries), an AC power source, compressed air or various other types of power sources. The cutting tool 20 is further preferably comprised of an angle grinder. It is appreciated however that the cutting tool 20 may be comprised of various other power tool configurations all which are able to attach to and operate a rotary blade (not shown) or a jigsaw blade 22.

In the preferred embodiment of the present invention, the abrasive disc commonly associated with the cutting tool 20 is removed and a circular blade 22 is attached in place of the abrasive disc as illustrated in FIGS. 2 and 4 through 8. The blade 22 is comprised of a configuration to efficiently cut through various conduits 12 or cables 14. The blade 22 also includes a cutting edge 24, wherein the cutting edge 24 is preferably comprised of a plurality of teeth. The cutting edge 24 is also preferably comprised of a configuration that will resist becoming dull with normal usage of cutting conduit 12 and/or cable 14.

C. First Support Structure

The first support structure 30 is attached to the cutting tool 20 as illustrated in FIGS. 4 through 8. The first support structure 30 may be comprised of various configurations, such as but not limited to a guard commonly associated with angle grinders to protect the individual from the cutting edge 24 of the blade 22 opposite the working portion of the blade 22. It is appreciated that the first support structure 30 may be comprised of various configurations rather than the preferred embodiment to efficiently attach to various types of cutting tools 20. It is appreciated that the working portion as described herein is the portion of the cutting edge 24 that engages the material that is to be cut (i.e. conduit 12, cable 14, etc.) during use of the present invention.

Figure 2:
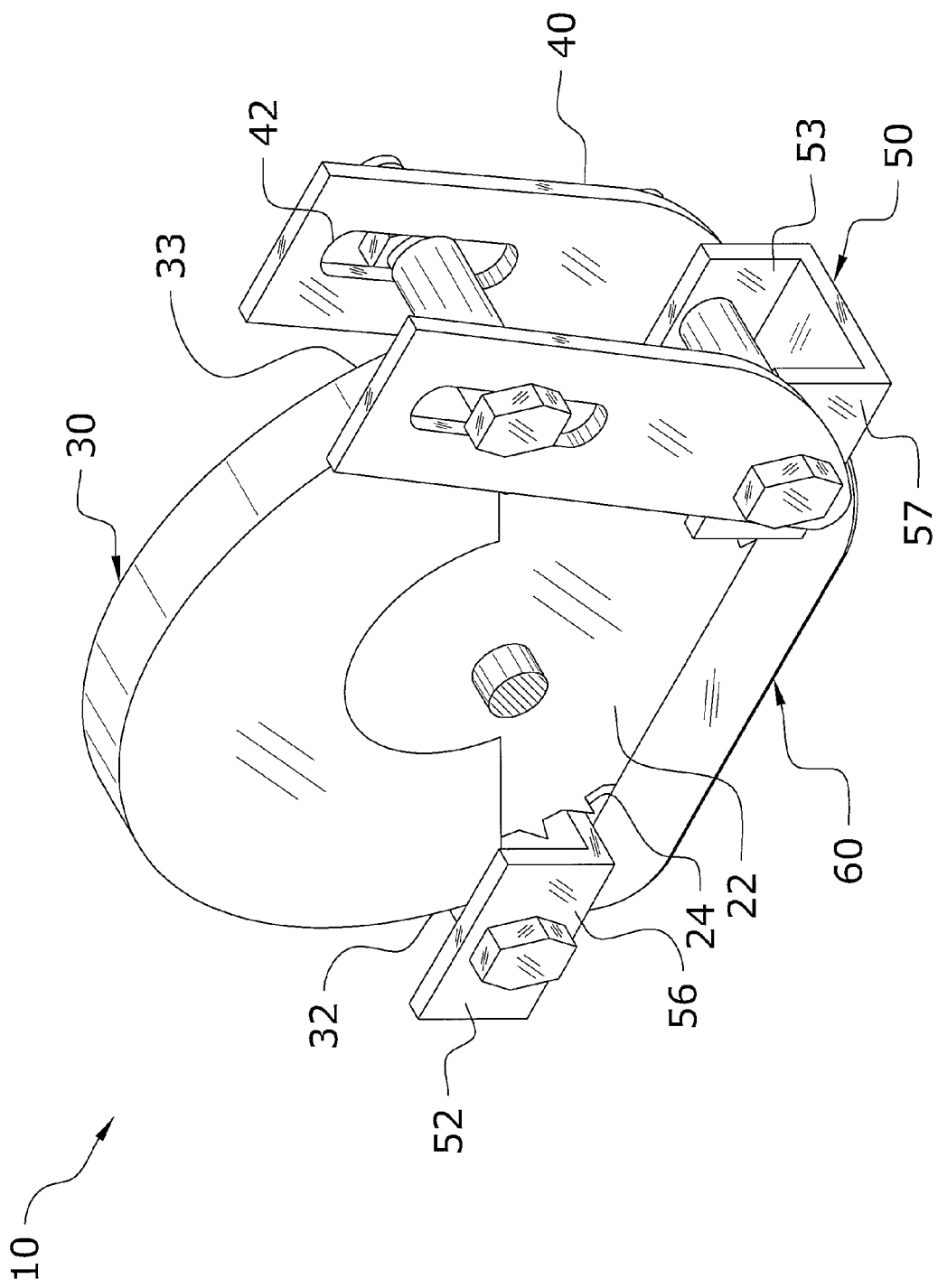
FIG. 2 is an upper perspective view of the present invention with the cutting tool removed.
Figure 3:
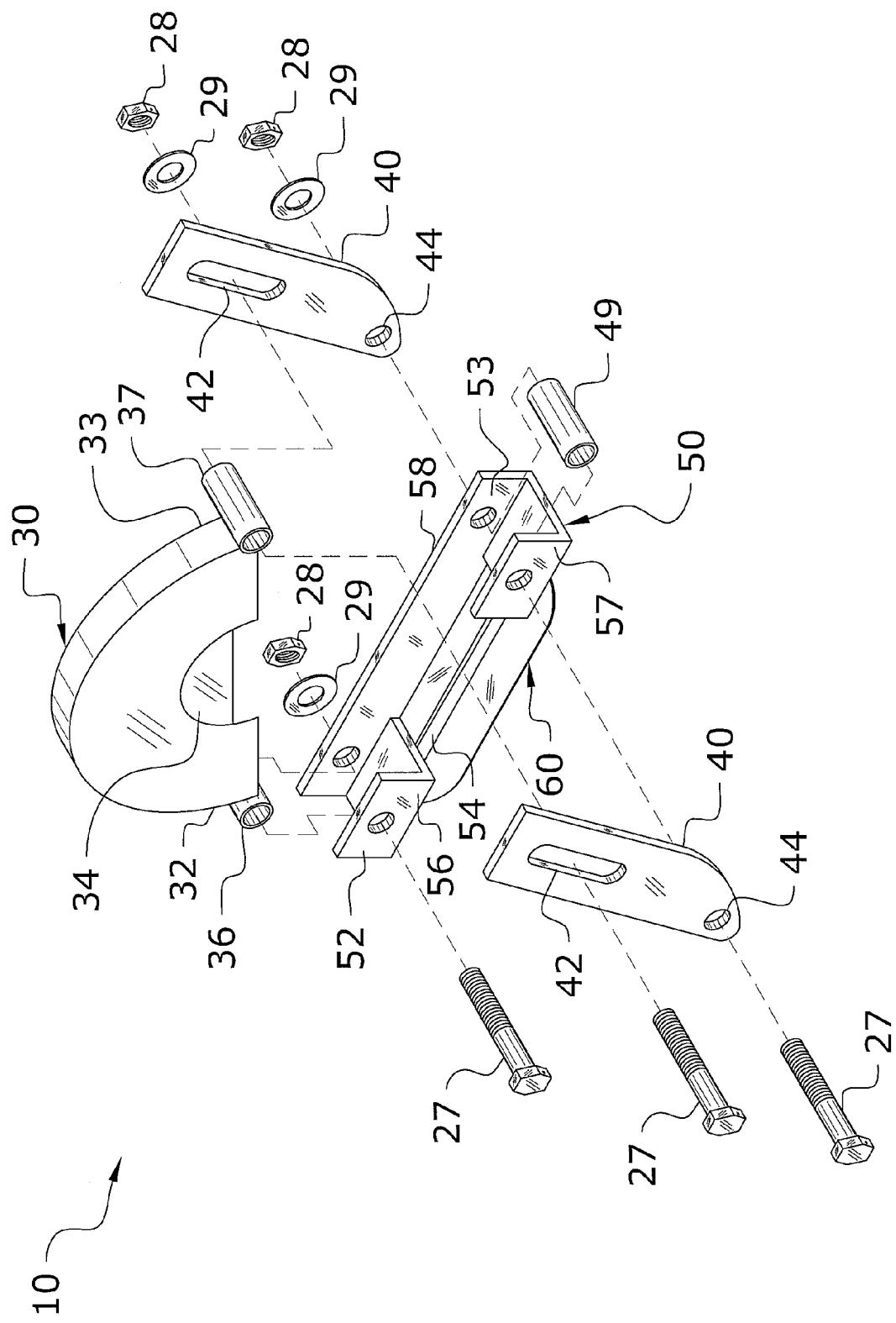
FIG. 3 is an exploded upper perspective view of the present invention.

The first support structure 30 may be comprised of various materials, such as but not limited to plastic or metal. In the preferred embodiment of the present invention the first support structure 30 is comprised of a galvanized steel material. The first support structure 30 also includes the first inner end 32 and the first outer end 33 as illustrated in FIGS. 1 through 3. The first inner end 32 is preferably adjacent a handle of the cutting tool 20 and the first outer end 33 is preferably opposite the handle of the cutting tool 20 and adjacent a forward direction of travel of the blade 22 as shown in FIGS. 5 through 8.

Figure 4:
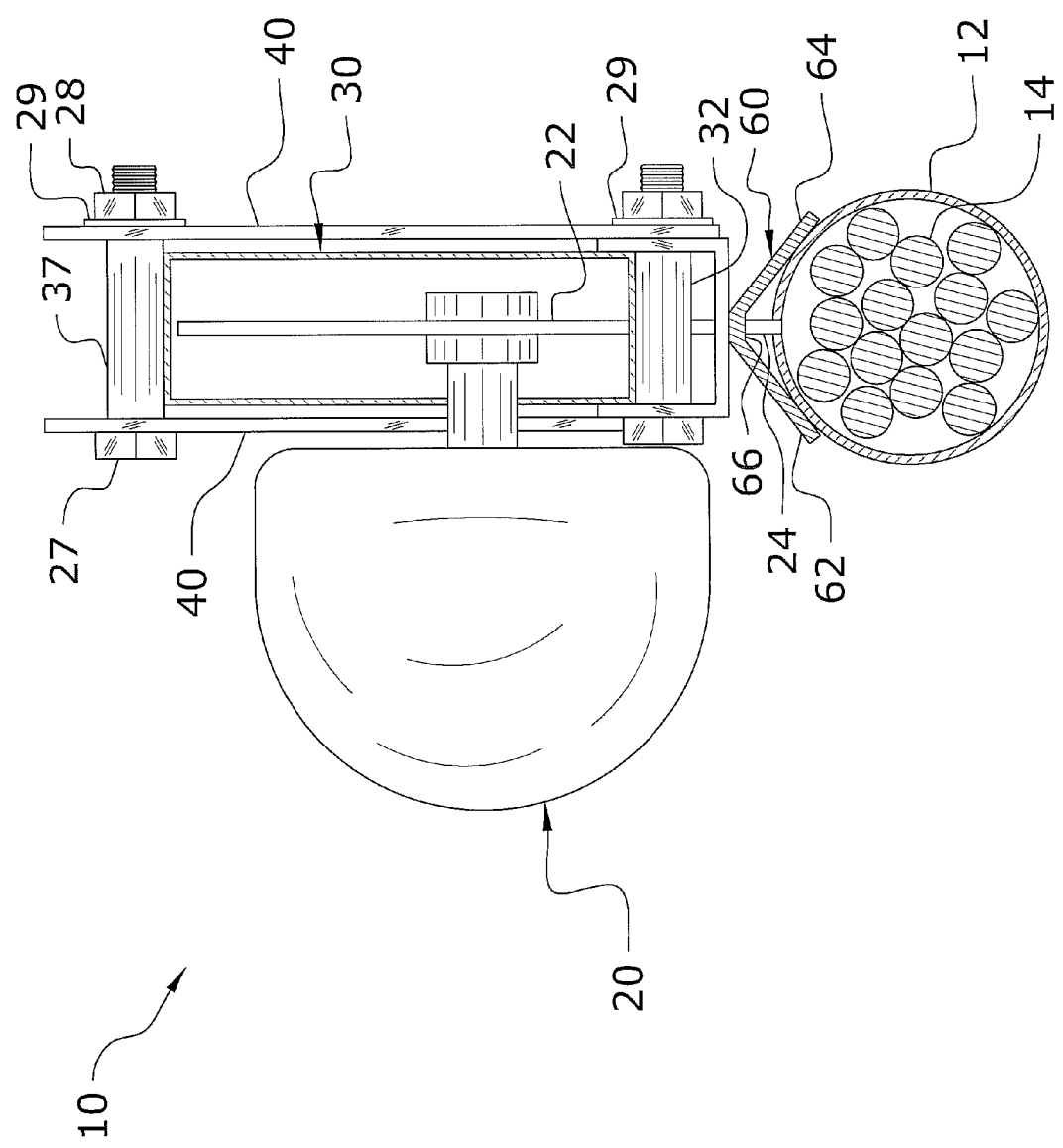
FIG. 4 is a front cross-sectional view of the present invention in use.

The first support structure 30 also includes a cavity 34 extending between the first inner end 32 and the first outer end 33 as illustrated in FIGS. 3 and 4. The blade 22 preferably extends within the cavity 34 to protect the individual from engaging the portion of the blade 22 opposite the working portion during use.

The first support structure 30 also preferably includes a first inner spacer 36 and a first outer spacer 37 as illustrated in FIG. 3. The first inner spacer 36 is attached to the first inner end 32 and the first outer spacer 37 is attached to the first outer end 33. The first inner spacer 36 and the first outer spacer 37 preferably extend across the first support structure 30 and are further preferably fixedly attached to the first support structure 30. It is appreciated that the first inner spacer 36 and the first outer spacer 37 may be fixedly attached utilizing various methods, such as but not limited to weldably attached.

The first inner spacer 36 and the first outer spacer 37 are also preferably comprised of a tubular structure, wherein the first inner spacer 36 and the first outer spacer 37 each receive a fastener 27 (i.e. bolt, pin, etc.) to attach the first support structure 30 to the second support structure 50 and adjustment member 40, respectively, as illustrated in FIGS. 1 through 4. The length of the first inner spacer 36 and the length of the first outer spacer 37 are further preferably substantially similar or slightly greater than the width of the first support structure 30.

D. Adjustment Member

The present invention preferably includes a pair of adjustment members 40 attaching the first support structure 30 to the second support structure 50 as illustrated in FIGS. 1 through 4. The adjustment members 40 allow the first support structure 30 to vertically adjust about the second support structure 50 so as to adjust the distance the cutting edge 24 extends through the opening 54 of the second support structure 50 and thus the depth cut by the blade 22.

The adjustment members 40 may be comprised of various materials, such as but not limited to plastic or metal. In the preferred embodiment of the present invention the adjustment members 40 are comprised of a galvanized steel material.

The adjustment members 40 each include a slot 42 and an aperture 44 as illustrated in FIG. 3. The slot 42 is preferably comprised of an elongated slot 42, wherein a fastener 27 extends through the first outer spacer 37 and opposing adjustment members 40. The fastener 27 is further secured by a securing member 28 (i.e. nut, etc.) and may also include various washers 29 to provide a more secure connection. The fastener 27 is selectively loosened and tightened about the slot 42 when adjusting the distance between the first outer end 33 and the second outer end 53 and thus the distance that the blade 22 extends through the opening 54.

A second spacer 49 is also preferably positioned within a second bracket 57 and between the adjustment members 40 adjacent the second outer end 53. The second spacer 49 is preferably comprised of a tubular configuration. Another fastener 27 preferably extends through the second spacer 49, the apertures 57a of the second bracket 57 and the apertures 44 of the adjustment members 40, connecting bracket 58 and adjustment members 40 to attach the second outer end 53 of the second support structure 50 to the adjustment members 40 as illustrated in FIG. 3.

The adjustment members 40 are also preferably pivotally attached adjacent to the second outer end 53 to allow the first outer end 33 to more efficiently adjust about the slot 42. The end of the adjustment members 40 adjacent the second outer end 53 is further preferably comprised of a curved configuration as illustrated in FIG. 3.

E. Second Support Structure

The second support structure 50 is attached to the first support structure 30 and the adjustment members 40 as illustrated in FIGS. 1 through 8. It is appreciated that the second support structure 50 may be comprised of various configurations rather than the preferred embodiment all which efficiently attach to various types of first support structures 30.

The second support structure 50 may be comprised of various materials, such as but not limited to plastic or metal. In the preferred embodiment of the present invention the second support structure 50 is comprised of a galvanized steel material. As previously described, the second support structure 50 also includes the second inner end 52 and the second outer end 53 as illustrated in FIG. 3. The second inner end 52 is preferably pivotally attached to the first inner end 32 of the first support structure 30 and the second outer end 53 is preferably pivotally attached to the aperture 44 of the adjustment members 40 adjacent the forward direction of travel of the blade 22 as illustrated in FIGS. 5 through 8.

As previously described, the second support structure 50 also includes the opening 54 extending between the second inner end 52 and the second outer end 53 as illustrated in FIG. 3. The cutting edge 24 and working portion of the blade 22 extend through the opening 54.

The second support structure 50 is preferably comprised of a first bracket 56, the second bracket 57 and a connecting bracket 58 extending between the first bracket 56 and the second bracket 57. The first bracket 56, the second bracket 57 and the connecting bracket 58 preferably receive the first inner spacer 36 and the second spacer 49 as illustrated in FIG. 3. The first bracket 56, the second bracket 57 and the connecting bracket 58 also include apertures 56a, 56b to receive the fasteners 27.

It is appreciated that the opening 54 further preferably extends between the first bracket 56 and the second bracket 57. The first bracket 56, the second bracket 57 and the connecting bracket 58 are preferably comprised of an integrally formed structure; however it is appreciated that the first bracket 56, the second bracket 57 and the connecting bracket 58 may be comprised of separate structures. The first bracket 56 and connecting bracket 58 and the second bracket 57 and connecting bracket 58 preferably each form a U-shaped structure to efficiently receive and secure the first inner spacer 36 and the second spacer 49 as illustrated in FIG. 3.

F. Guide Structures

The present invention may include various guide structures 60 (FIGS. 1-6), 70 (FIGS. 7-8) to accommodate various types of cutting (i.e. longitudinally along the conduit 12, circularly around the conduit 12, etc.). The guide structures 60, 70 each extend from the second support structure 50 opposite the first support structure 30 and adjacent the working portion of the blade 22 as illustrated in FIGS. 4 through 8. The guide structures 60, 70 may be comprised of various materials, such as but not limited to plastic or metal. In the preferred embodiment of the present invention the guide structures 60, 70 are comprised of a galvanized steel material.

It is appreciated that the guide structures 60, 70 may be fixedly attached to the second support structure 50, wherein various second support structures 50 and attached guide structures 60, 70 may be interchanged upon the first support structure 30. It is also appreciated that the guide structures 60, 70 may be removably attached upon the second support structure 50, wherein various guide structures 60, 70 may be interchanged upon the second support structure 50.

The first guide structure 60 is preferably utilized to cut longitudinally along a conduit 12 as illustrated in FIGS. 1 through 6. The first guide structure 60 extends along a longitudinal axis of the second support structure 50. The first guide structure 60 also includes a first support member 62 and a second support member 64, wherein a channel 66 extends between the first support member 62 and the second support member 64. The channel 66 is also aligned with the opening 54, wherein the working portion of the blade 22 extends through the channel 66.

The first support member 62 and the second support member 64 preferably mirror each other about the channel 66. The first support member 62 and the second support member 64 further serve to stabilize the present invention upon the conduit 12 as illustrated in FIG. 4. The first support member 62 and the second support member 64 also ensure that the present invention cuts the conduit 12 at a consistent depth as the present invention is longitudinally moved along the conduit 12 in use.

Figure 5:
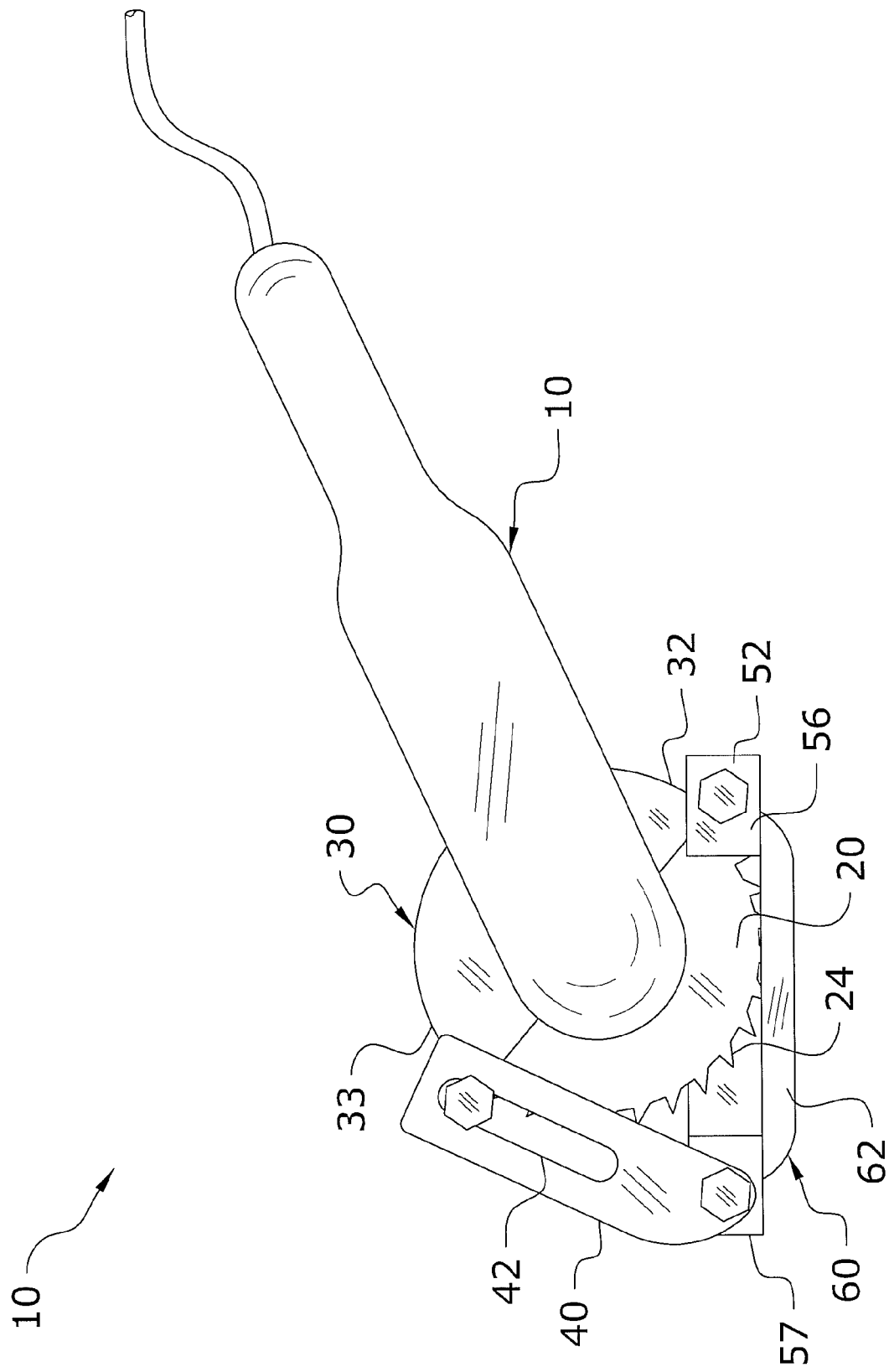
FIG. 5 is a side view of the present invention attached to a cutting tool.
Figure 6:
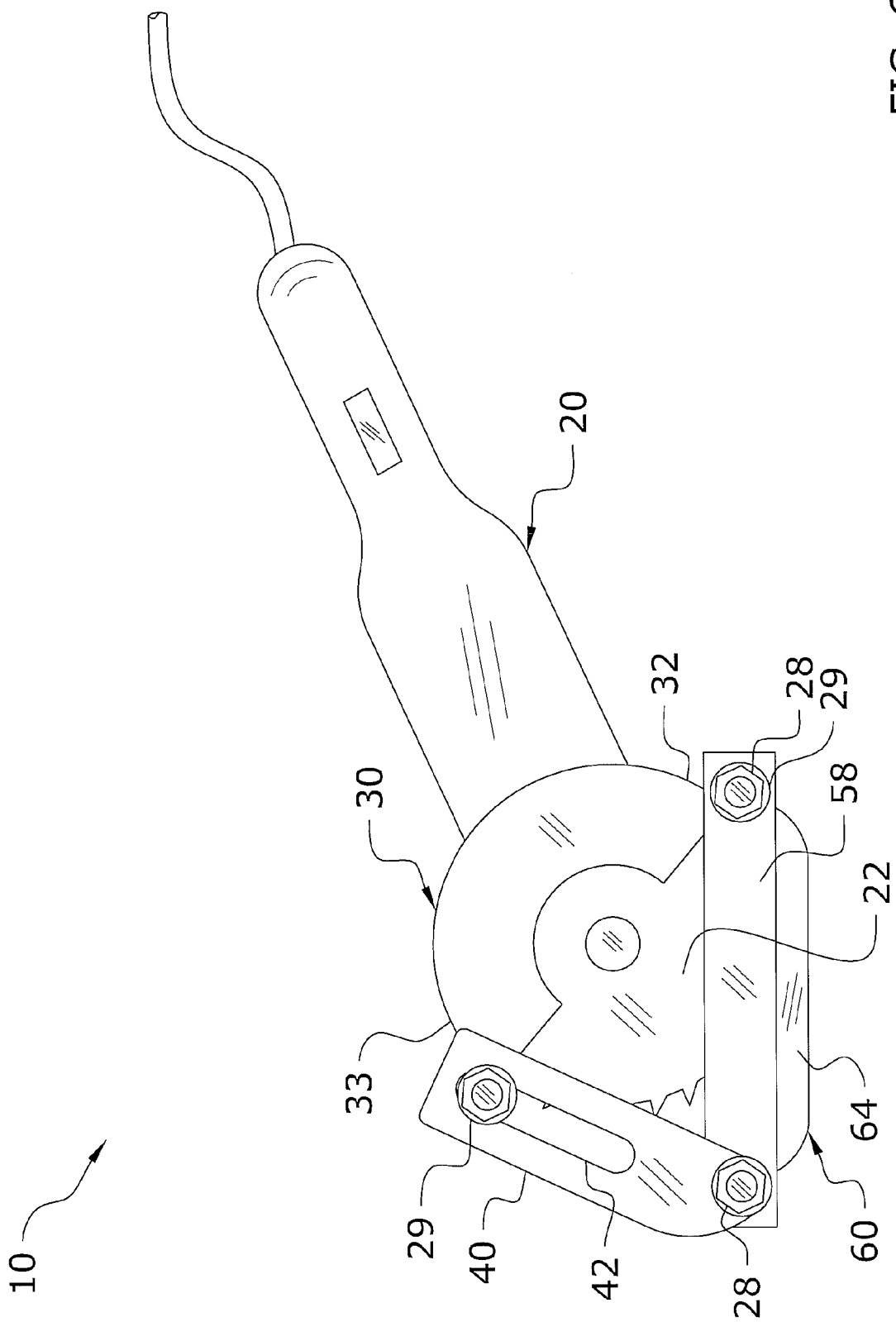
FIG. 6 is an opposite side view with respect to FIG. 5 of the present invention attached to a cutting tool.

A first angle between the first support member 62 and the working portion of the blade 22 and a second angle between the second support member 64 and the working portion of the blade 22 are preferably comprised of complementary angles as illustrated in FIG. 4. It is also appreciated that the opposing ends of the first support member 62 and the second support member 64 may be comprised of a curved configuration to more efficiently move the present invention about the conduit 12 as shown in FIGS. 5 and 6.

Figure 7:
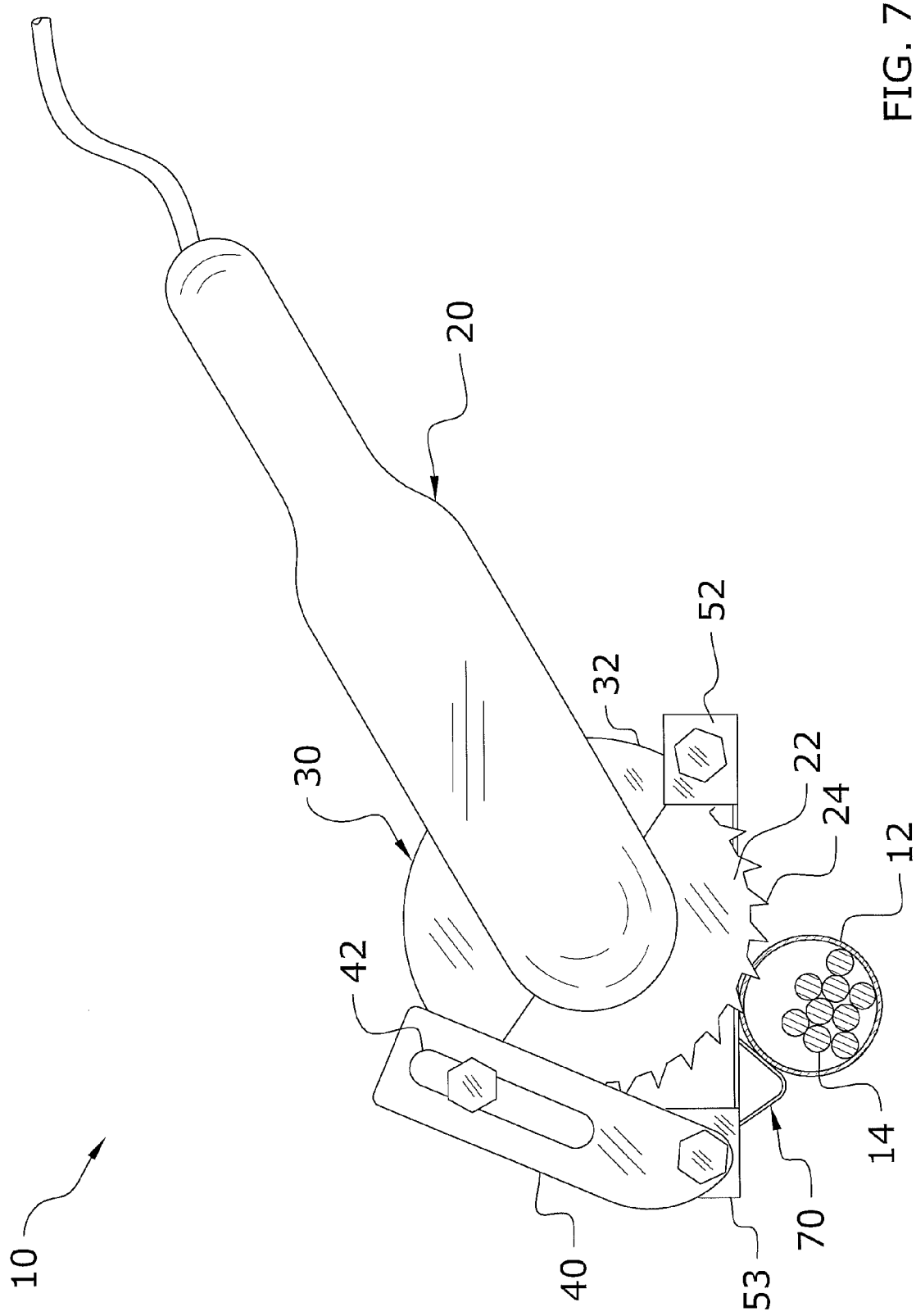
FIG. 7 is a side view of an alternate configuration of the present invention in use.
Figure 8:
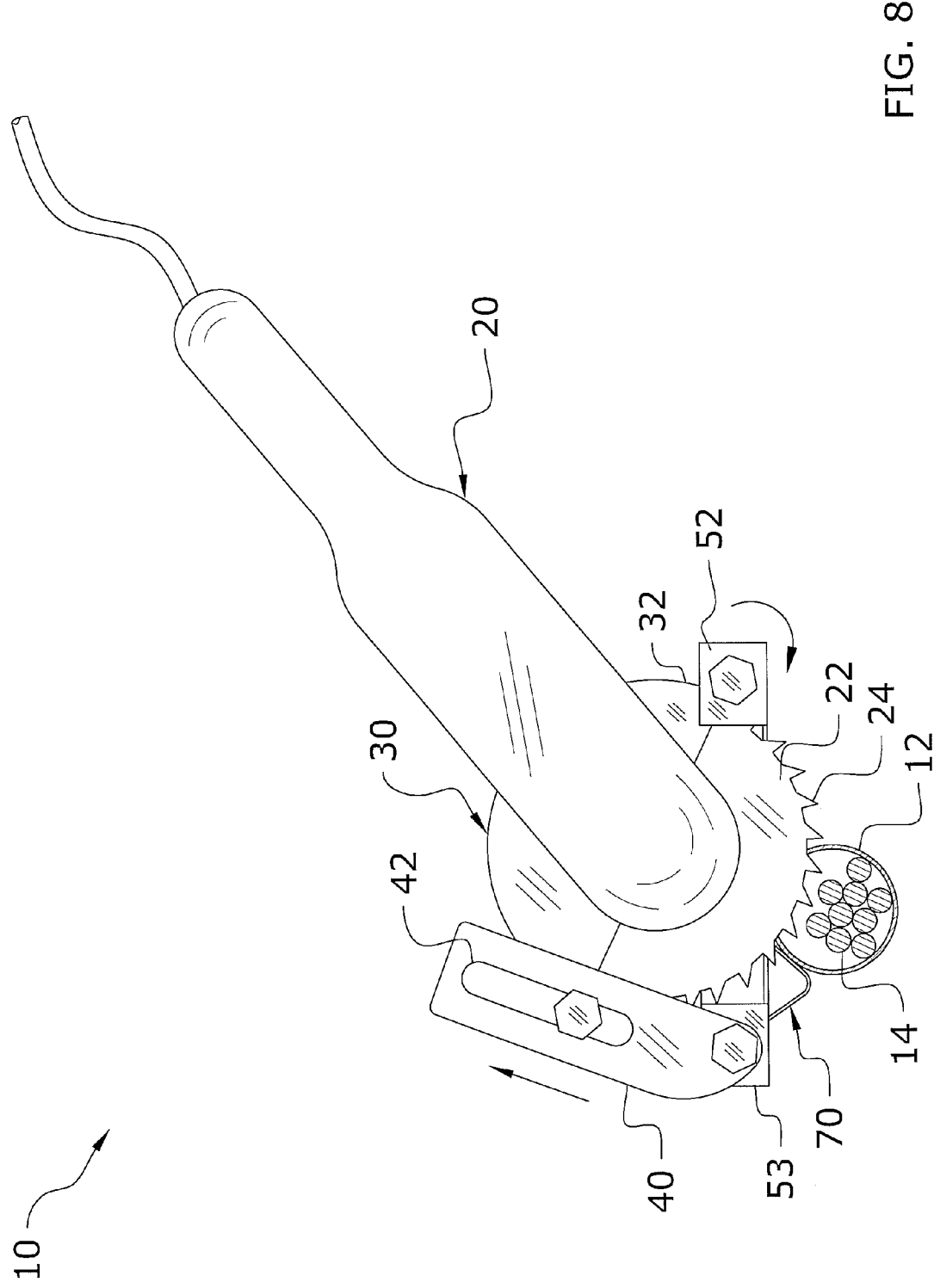
FIG. 8 is a side view of the alternate configuration of FIG. 7 in use, wherein the blade is adjusted downwards.

The second guide structure 70 is preferably utilized to cut around a perimeter of the conduit 12 or cable 14 as illustrated in FIGS. 7 and 8. The second guide structure 70 is preferably positioned between the forward portion of the present invention (i.e. second outer end 53) and the working portion of the blade 22. The second guide structure 70 serves to stabilize the present invention about the conduit 12 or cable 14 as the present invention is in use.

The second guide structure 70 is preferably comprised of a triangular configuration to allow the second guide structure 70 to efficiently travel along the outer perimeter of the conduit 12. The second guide structure 70 also preferably includes a curved lower end to also allow the second guide structure 70 to efficiently move around the conduit 12 or cable 14.

G. In Use

In use, the present invention is first assembled in a manner similar to as previously described. The appropriate guide structure 60, 70 is also ensured to be assembled upon the present invention depending on what type of cutting is to be done (i.e. first guide structure 60 to cut longitudinally along the conduit 12, second guide structure 70 to cut circularly around the perimeter of the conduit 12). The fastener 27 extending through the first outer spacer 37 is then slightly loosened and the first support structure 30 is pivotally adjusted about the second support structure 50 until the cutting edge 24 of the blade 22 extends a sufficient distance from the second support structure 50.

It is appreciated that the sufficient distance is preferably substantially similar to or slightly less than the thickness of the material (i.e. conduit 12, cable 14, etc.) that is to be cut so as not to damage the internal components of the material (i.e. electrical wires, etc.). It is also appreciated that the fasteners 27 extending through the first inner spacer 36 and the second spacer 49 may need to be slightly loosened to allow the first support structure 30 to pivot about the second support structure 50.

Once the correct distance of the cutting edge 24 extending from the second support structure 50 is set, the fasteners 27 may be retightened. The cutting tool 20 may now be started and the working portion of the blade 22 aligned with the area to be cut. The cutting tool 20 may now be utilized in a normal manner until finished.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A precision cutting system, comprising:

a cutting tool having a rotatable blade, said blade having cutting edge defining a cutting plane; and a guide assembly removably attached to said cutting tool, said guide assembly comprising a first support structure, a second support structure, a guide structure for guiding a workpiece, and at least one adjustment member, wherein said cutting tool is separable from said guide assembly such that said cutting tool is operable and useable without said guide assembly;

said first support structure including a first inner end, a first outer end, and a cavity therebetween, wherein part of said blade is disposed within said cavity and said first support structure substantially surrounds said part of said blade such that said first support structure functions as a blade guard, wherein said first support structure provides the only attachment of said cutting assembly to said cutting tool so that said cutting tool and said first support structure move together, and wherein said blade of said cutting tool extends out of said first support structure between said first inner end and said first outer end;

said second support structure including a second inner end and a second outer end, wherein said first support structure is movably attached to said second support structure;

said guide structure fixed to and extending from said second support structure adjacent a working portion of said blade, said guide structure disposed on an opposite side of said second support structure relative to said first support structure, said guide structure including a first support member, a second support member and a channel extending along and between said first and second support members, said channel defining a longitudinal axis of said guide structure and said working portion of said blade extending through said channel and between said first and second support members, said first and second support members extending along said longitudinal axis, and said first and second support members diverging from one another in a direction substantially orthogonal to said longitudinal axis and away from said first support structure and away from said channel to form an open side of said guide structure for providing access for the blade to a workpiece in a directed that is orthogonal to said longitudinal axis, wherein a transverse angle is formed between said first and second support members, said first support member forming a first angle with said cutting plane of said blade, and said second support member forming a second angle with said cutting plane of said blade, said first and second angles being acute angles on opposite sides of said cutting plane, and all of said angles being measured in a plane that is substantially orthogonal to said longitudinal axis; and said at least one adjustment member connected to said first support structure and to said second support structure for adjusting and fixing the relative positions between said first and second support structures;

wherein the amount of said blade that extends through said channel is adjustable and fixable by moving said first support structure relative to said second support structure and then fixing said adjustment by said at least one adjustment member for exposing a selected amount of said working portion of said blade to set a depth of a cut in said workpiece.

2. The precision cutting system of claim 1, wherein said first angle and said second angle are substantially complementary angles.

3. The precision cutting system of claim 1, wherein said working portion of said blade bisects said transverse angle such said first angle and said second angle are substantially equal.

4. The precision cutting system of claim 1, wherein said first and second support members of said guide structure each includes a curved lower end.

5. The precision cutting system of claim 1, wherein said guide structure is comprised of a triangular configuration.

6. The precision cutting system of claim 1, wherein said first inner end of said first support structure is pivotally attached to said second inner end of said second support structure.

7. The precision cutting system of claim 6, wherein said first outer end of said first support structure adjusts towards and away from said second outer end of said second support structure via said at least one adjustment member, said at least one adjustment member connected to and extending between said first outer end and said second outer end.

8. The precision cutting system of claim 7, wherein said at least one adjustment member pivotally adjusts about said second outer end of said second support structure.

9. The precision cutting system of claim 8, wherein said at least one adjustment member includes an elongated slot, wherein said first outer end adjusts along said elongated slot.

10. The precision cutting system of claim 1, wherein said cutting tool is comprised of an angle grinder.

* * * * *